United States Patent
Meng et al.

(10) Patent No.: US 12,223,291 B2
(45) Date of Patent: Feb. 11, 2025

(54) MATRIX MULTIPLICATION ENGINES

(71) Applicant: MemryX Incorporated, Ann Arbor, MI (US)

(72) Inventors: Fan-hsuan Meng, Ann Arbor, MI (US); Mohammed Zidan, Ann Arbor, MI (US); Zhengya Zhang, Ann Arbor, MI (US); Wei Lu, Ann Arbor, MI (US)

(73) Assignee: MemryX Incorporated, Ann Arbor, MI (US)

( * ) Notice: Subject to any disclaimer, the term of this patent is extended or adjusted under 35 U.S.C. 154(b) by 298 days.

(21) Appl. No.: 17/000,192

(22) Filed: Aug. 21, 2020

(65) Prior Publication Data
US 2022/0057993 A1    Feb. 24, 2022

(51) Int. Cl.
*G06F 7/544* (2006.01)
*G06F 17/15* (2006.01)
*G06F 17/16* (2006.01)

(52) U.S. Cl.
CPC ............ *G06F 7/5443* (2013.01); *G06F 17/15* (2013.01); *G06F 17/16* (2013.01)

(58) Field of Classification Search
CPC .................. G06F 5/443; G06F 17/16
See application file for complete search history.

(56) References Cited

U.S. PATENT DOCUMENTS

| | | |
|---|---|---|
| 2005/0193050 A1 | 9/2005 | Sazegari |
| 2010/0284626 A1 | 11/2010 | Malm et al. |
| 2011/0040822 A1 | 2/2011 | Eichenberger et al. |
| 2011/0307685 A1* | 12/2011 | Song ............. G06F 17/10 712/16 |
| 2014/0149717 A1 | 5/2014 | Sprangle |
| 2019/0272308 A1* | 9/2019 | Doi ............. G06F 7/5324 |
| 2021/0182465 A1* | 6/2021 | Langhammer ......... G06N 20/00 |

FOREIGN PATENT DOCUMENTS

KR    1020190128795    11/2019

* cited by examiner

*Primary Examiner* — Michael D. Yaary

(57) ABSTRACT

A matrix multiplication engine can include a plurality of processing elements configured to compute a matrix dot product as a summation of a sequence of vector-vector outer-products.

17 Claims, 9 Drawing Sheets

MATRIX MULTIPLICATION ENGINES

BACKGROUND OF THE INVENTION

Vector-vector multiplication, vector-matrix multiplication and matrix-matrix multiplication are common functions performed by computing devices in artificial intelligence, machine learning, deep learning, and various other applications. Artificial intelligence as used herein refers to techniques that enable devices to mimic human intelligence, using logic, if-then rules, decision trees, and the like. Machine learning includes a subset of artificial intelligence that includes abstruse statistical techniques that enable machines to improve at tasks with experience. Deep learning includes a subset of machine learning that includes algorithms that permit software to train itself to perform tasks by exposing multilayered artificial neural networks, recurrent neural networks (RNN), convolution neural networks (CNN) or the like to vast amounts of data. For ease of explanation artificial intelligence, as used herein, also includes machine learning, deep learning and the like.

Referring to FIG. 1, matrix-matrix multiplication between Matrix A 110 and Matrix B 120 is illustrated. Matrix A 110 can include M rows and N columns of element values, and Matrix B 120 can include N rows and O columns of element values. The element values can be n-bit binary values. However, it is appreciated that the element values can be of any predetermined number of bits. The matrix dot product of Matrix A 110 and Matrix B 120 can be computed in accordance with Equation 1:

$$C_{ij} = \sum_{k=1}^{N} a_{ik} \times b_{kj}, i = 1 \sim M, j = 1 \sim O \qquad (1)$$

Referring now to FIG. 2, a computing device for computing matrix-matrix multiplication according to the conventional art is shown. The computing device can include a memory 210 and an array of processing elements 220. In the conventional computing device each processing element is configured to compute a vector-vector product of a corresponding row and corresponding column in accordance with Equation 1. The elements of the corresponding row and corresponding column are sequentially loaded from memory into the corresponding processing elements, multiplied and summed together with the products of the other elements of the corresponding row and corresponding column. Accordingly, the matrix-dot products on the conventional computing device is computed by doing a vector-vector dot product of the rows in Matrix A 110 and columns in Matrix B 120.

The computation of the matrix dot product on the conventional computing device involves the repeated loading, of elements of Matrix A and Matrix B from memory 210 into the corresponding processing elements of the processor 220. Such computation of matrix dot products can be performed hundreds, thousands or even more times for a given application. Therefore, there is a need for improved techniques for performing matrix-matrix multiplication.

SUMMARY OF THE INVENTION

The present technology may best be understood by referring to the following description and accompanying drawings that are used to illustrate embodiments of the present technology directed toward matrix multiplication engines.

In one embodiment, a computing device can include one or more memories and an array of processing elements. The one or more memories can be configured to store a first matrix and a second matrix. The array of processing elements can be configured to receive corresponding columns of the first matrix and corresponding rows of the second matrix from the one or more memories. The array of processing elements can compute partial products of corresponding element values of the corresponding columns of the first matrix and the corresponding rows of the second matrix. The partial products of the corresponding element values of the corresponding columns of the first matrix and the corresponding rows of the second matrix can be accumulated by the array of processing elements to generate a third matrix representing the matrix dot product of the first and second matrices.

In another embodiment, a processor can include a plurality of processing elements configured to receive first and second matrices and compute a matrix dot product of the first and second matrices as a summation of a sequence of vector-vector outer-products. The processor can also compute a convolution of a first and second tensor by converting the first and second tensors to first and second matrices respectively. The plurality of processing elements can then compute a summation of vector-vector outer-products to compute the convolution.

In another yet embodiment, a computing device implemented method of computing a matrix-matrix dot product can include iteratively loading element values of corresponding columns or a first matrix and corresponding rows of a second matrix from memory into corresponding processing elements of an array of processing elements. In one implementation, element values of corresponding columns of the first matrix can be loaded into a first register of the corresponding processing elements, and element values of corresponding columns of the second matrix can be loaded into a second register of the corresponding processing elements The element values in the first register and the second register can be multiplied together by the corresponding processing elements. The partial products can be accumulated by the corresponding processing elements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
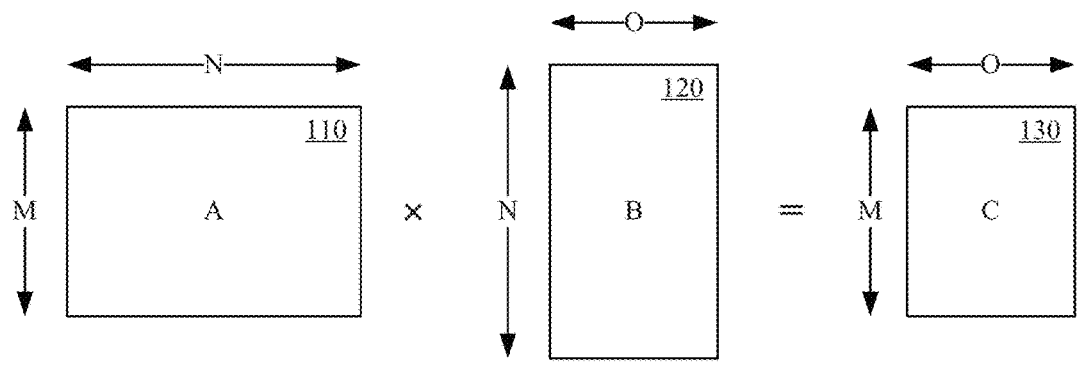
FIG. 1 illustrates matrix-matrix multiplication.
Figure 2:
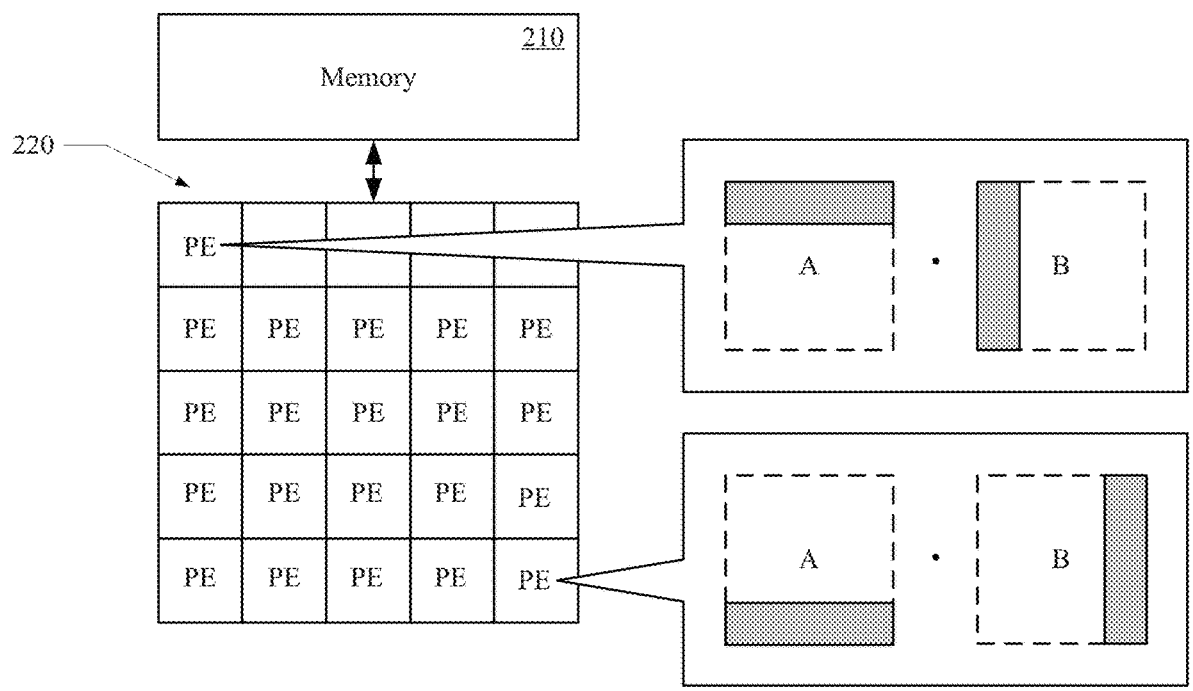
FIG. 2 shows a computing device for computing matrix-matrix multiplication according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 3:
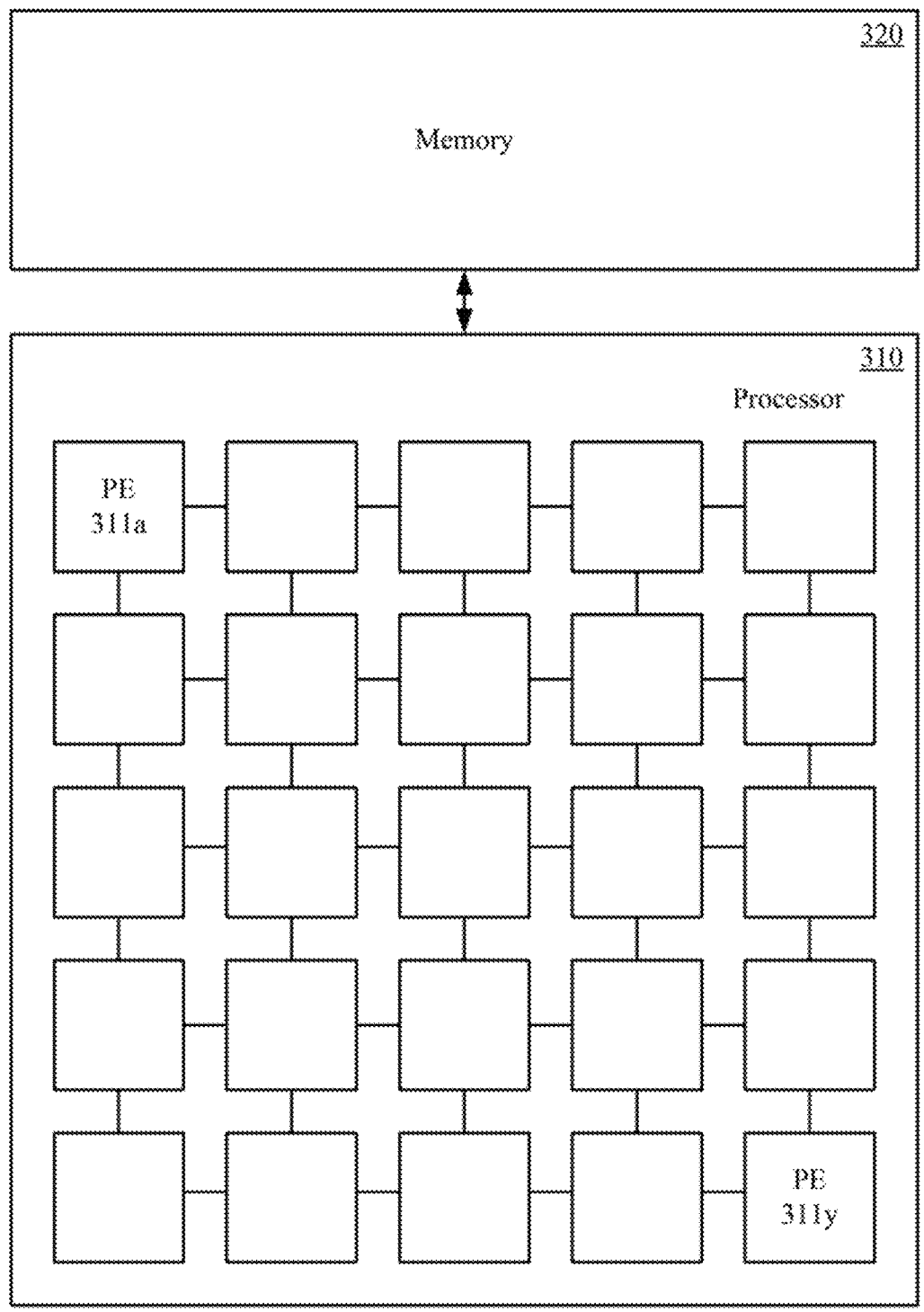
FIG. 3 shows a computing device for computing matrix-matrix multiplication, in accordance with aspects of the present technology.

Referring now to FIG. 3, a computing device for computing matrix-matrix multiplication, in accordance, with aspects of the present technology, is shown. The computing device can include one or more processors 310 coupled to one or more memories 320. The one or more processor 310 can include an array of processing elements 311a-311y. The computing device 300 can be configured to compute a matrix dot product as a summation of a sequence of vector-vector outer-products in accordance with Equation 2.

$$C = \sum_{k=1}^{N} A_k \otimes B_k, \ A_k = [a_{1,k}, a_{2,k}, \ldots, a_{m,k}], \quad (2)$$

$$B_k = [b_{k,1}, b_{k,2}, \ldots, b_{k,o}]$$

Figure 4:
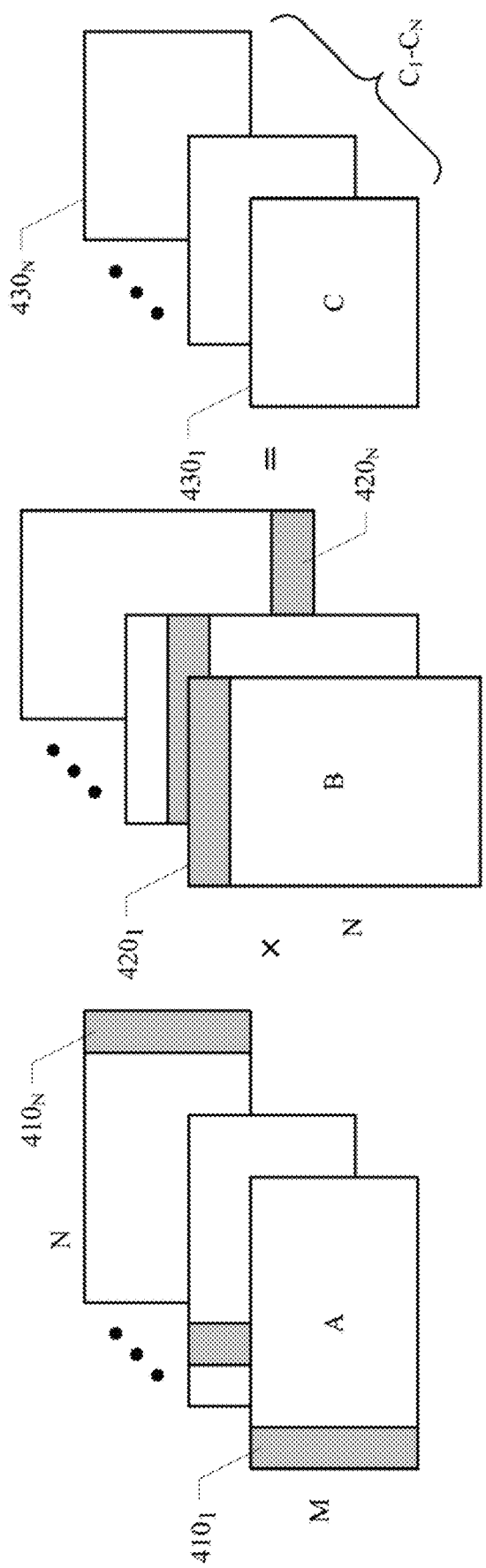
FIG. 4 illustrates matrix-matrix multiplication by summation of vector-vector outer-products, in accordance with aspects of the present technology.
Figure 5:
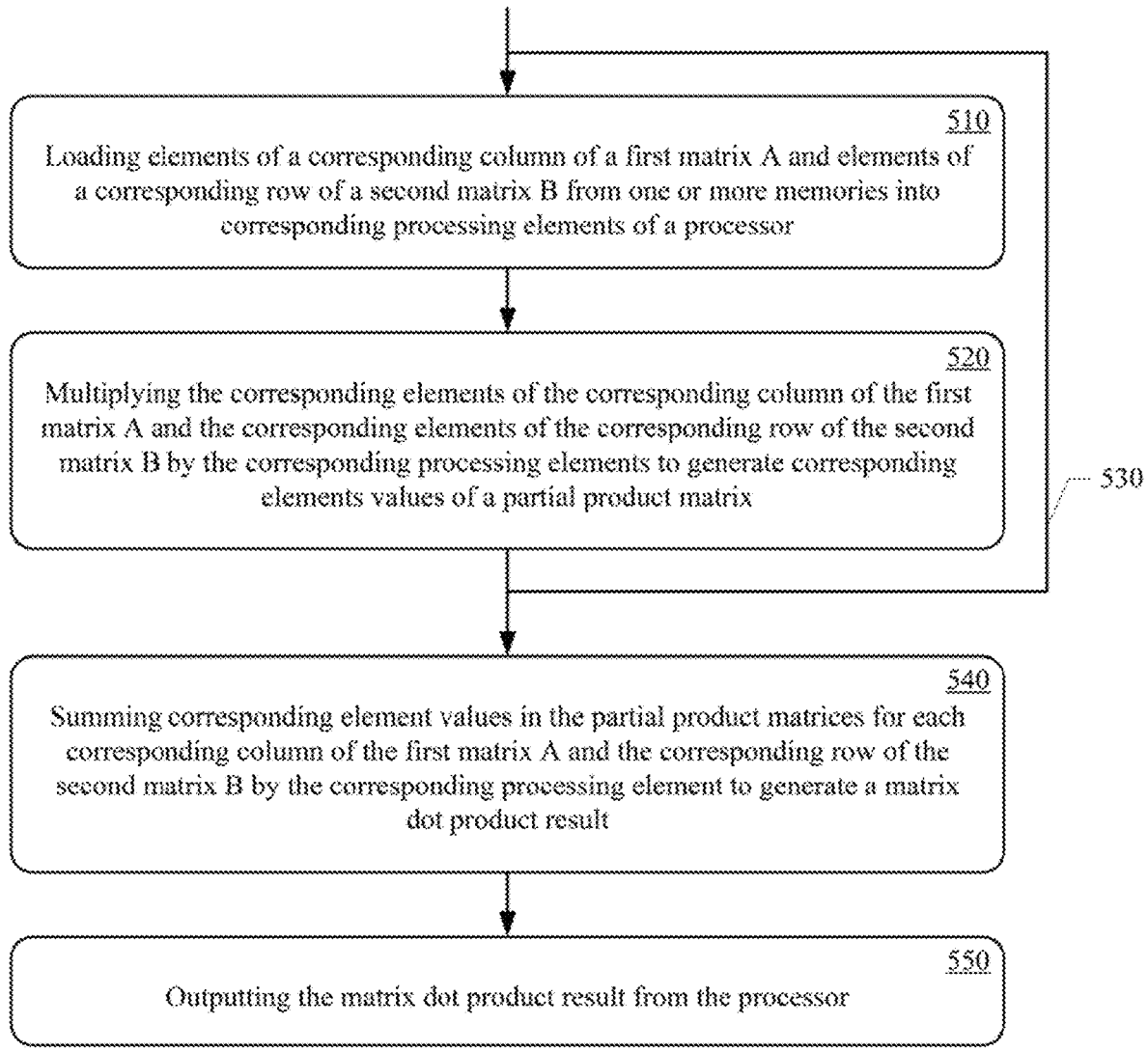
FIG. 5 shows a method of computing a matrix dot product as a summation of vector-vector outer-products on a computing device, in accordance with aspects of the present technology.

Operation of the computing device 300 will be further described with reference to FIGS. 4 and 5. FIG. 4 illustrates matrix-matrix multiplication as the summation of the sequence of vector-vector outer-products by the processing elements 311a-311y of the computing device 300. FIG. 5 shows an iterative method of computing the matrix dot products by the computing device 300, in accordance with aspects of the present technology. Computation of the dot product can include loading elements values of a corresponding column of a first matrix A and element values of a corresponding row of a second matrix B from one or more memories into corresponding processing elements of the processor, at 510. For example, in a first iteration the first element value in the first column $410_1$ of the first matrix A and the first element value in the first row $420_1$ of the second matrix can be loaded into a first processing element 311a, and so on, with an Mth element values in the first column $410_1$ of the first matrix and the Oth element value in the first row $420_1$ of the second matrix loaded into an (M×O)th processing element. In an Nth iteration, the first element value in the Nth column $410_N$ of the first matrix A and the first element value in the Nth row $420_N$ of the second matrix can be loaded into the first processing element 311a, and so on, with an Mth element values in the Nth column $410_N$ of the first matrix and the Oth element value in the first row 420a of the second matrix loaded into an (M×O)th processing element.

At 520, the corresponding elements of the corresponding column of the first matrix A and the corresponding elements of the corresponding row of the second matrix B can be multiplied by the corresponding processing elements to generate corresponding element values of a partial product matrix C. At 530, the processes at 510 and 520 can be iteratively performed for each set of corresponding columns of the first matrix A and the corresponding rows of the second matrix B. For example, in a first iteration the element values in the first column $410_1$ of the first matrix A and the elements values in the corresponding rows $420_1$ of the second matrix can be loaded into the corresponding processing elements 311a-311y. The first set of corresponding element values can then be multiplied by the corresponding processing elements 311a-311y. In a second iteration, the element values of the second column of the first matrix and corresponding element values of the second row of the second matrix can be loaded into the corresponding processing elements 311a-311y. The second set of corresponding element values can then be multiplied by the corresponding processing elements 311a-311y. The element values of the Nth column of the first matrix and the corresponding element values of the Nth row of the second matrix can be loaded into the corresponding processing elements 311a-311y and multiplied together in a last iteration.

At 540, corresponding element values in the partial products $C_1$-$C_N$, for each corresponding column of the first matrix A and the corresponding row of the second matrix B, can be summed by the corresponding processing elements 311a-311y to generate a matrix dot product result. In one implementation, the corresponding element values can be accumulated as they are computed at 530 to sum the partial products $C_1$-$C_N$. At 550, the matrix dot product result can be output from the processor 310. Outputting the matrix dot product can include storing the matrix dot product result in one or more memories, by outputting the matrix dot product result on a monitor, inputting it to another computing process performed on the computing device 300 or any other computing device, or the like. For a first matrix A of M×N and a second matrix B of N×O, the number of memory accesses for loading Matrix A from memory into the processor is M×N and the number of memory access for loading Matrix B from memory into the processor is N×O, assuming loading each element requires one memory access.

Figure 6:
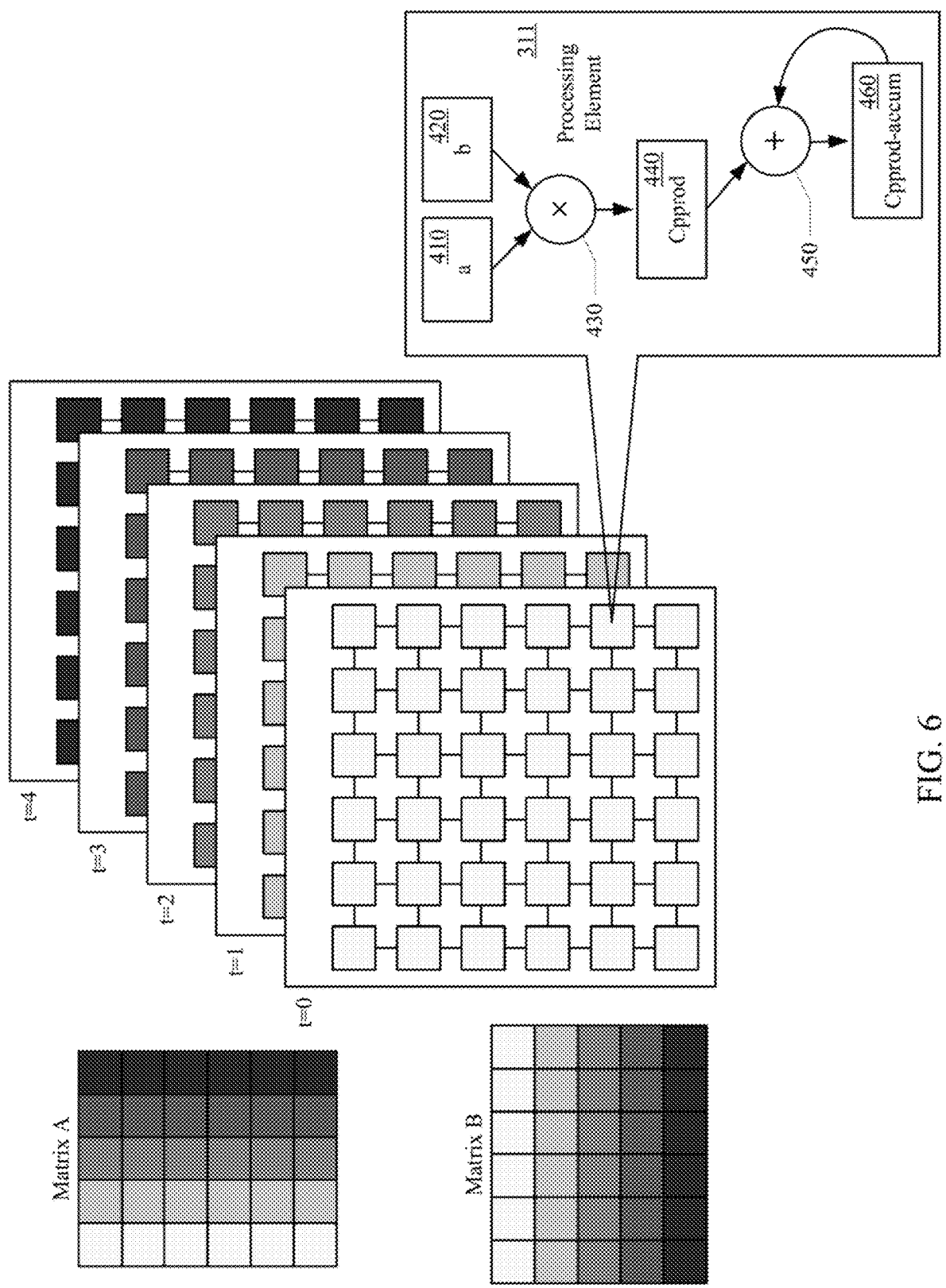
FIG. 6 shows a computation of a matrix dot product as a summation of vector-vector outer-products on a computing device, in accordance with aspects of the present technology.

The operation of the processor 300 will be further described with reference to FIG. 6. Each processing element 311, of the processor 310, can include a first register 410, a second register 420, a multiplication unit 430, a third register 440, a summation unit 450, and a fifth register 460. The first register 410 can be configured to receive element values of a first matrix A, and the second register 420 can be configured to receive element values of a second matrix B. The multiplication unit 430 can be configured to compute a partial product of the element values in the first and second registers 410, 420. The third register 110 can be configured to receive the partial product computed by the multiplication unit 430. The summation unit 450 can be configured to add the current partial product in the third register with the accumulated partial product in the fourth register 460 that is output back to the fourth register 460.

The plurality of processing elements 311 of the processor 300 can compute the summation of vector-vector outer-products. The summation of vector-vector outer-products of the first matrix A and the second matrix B can be computed by loading element values of a corresponding column of the first matrix A into the first register of the corresponding processing elements and element values of a corresponding row of the second matrix into the second register of the corresponding processing elements. In each iteration (e.g., t=0 through t=N), the element values of the corresponding column of the first matrix A and the corresponding row of matrix B are loaded into the respective first and second registers of the corresponding processing elements of the processor.

The respective multiplication units 430 of the processing elements can multiply the corresponding element values of the corresponding column of the first matrix and the corresponding element values of the corresponding row of the second matrix B. The partial products of the corresponding element values of the corresponding column of the first matrix and the corresponding element values of the corresponding row of the second matrix B can be output to the respective third register 440 of the corresponding processing elements.

The respective summation unit 450 of the processing elements can add the current partial product in the respective third register 440 to the accumulated partial product in the fourth register 460 and output the sum back to the fourth register. After iterating through the sets of corresponding columns of the first matrix A and the rows of the second matrix B, the plurality of processing elements can output the accumulated partial products in the respective fourth registers as the computed matrix dot product.

Figure 7:
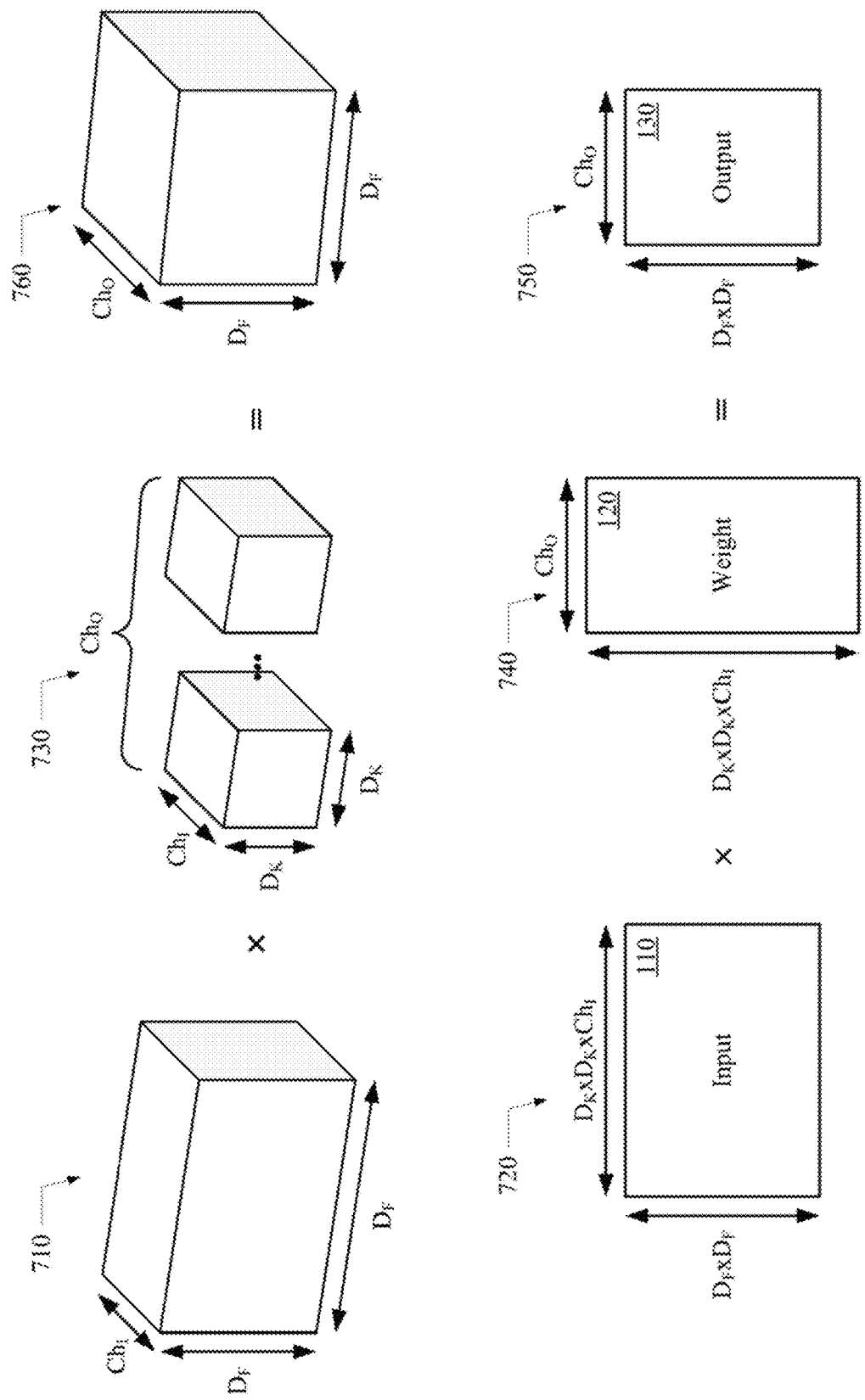
FIG. 7 illustrates conversion of a convolution for computation of a matrix dot product as a summation of vector-vector outer-products on a computing device, in accordance with aspects of the present technology.
Figure 8:
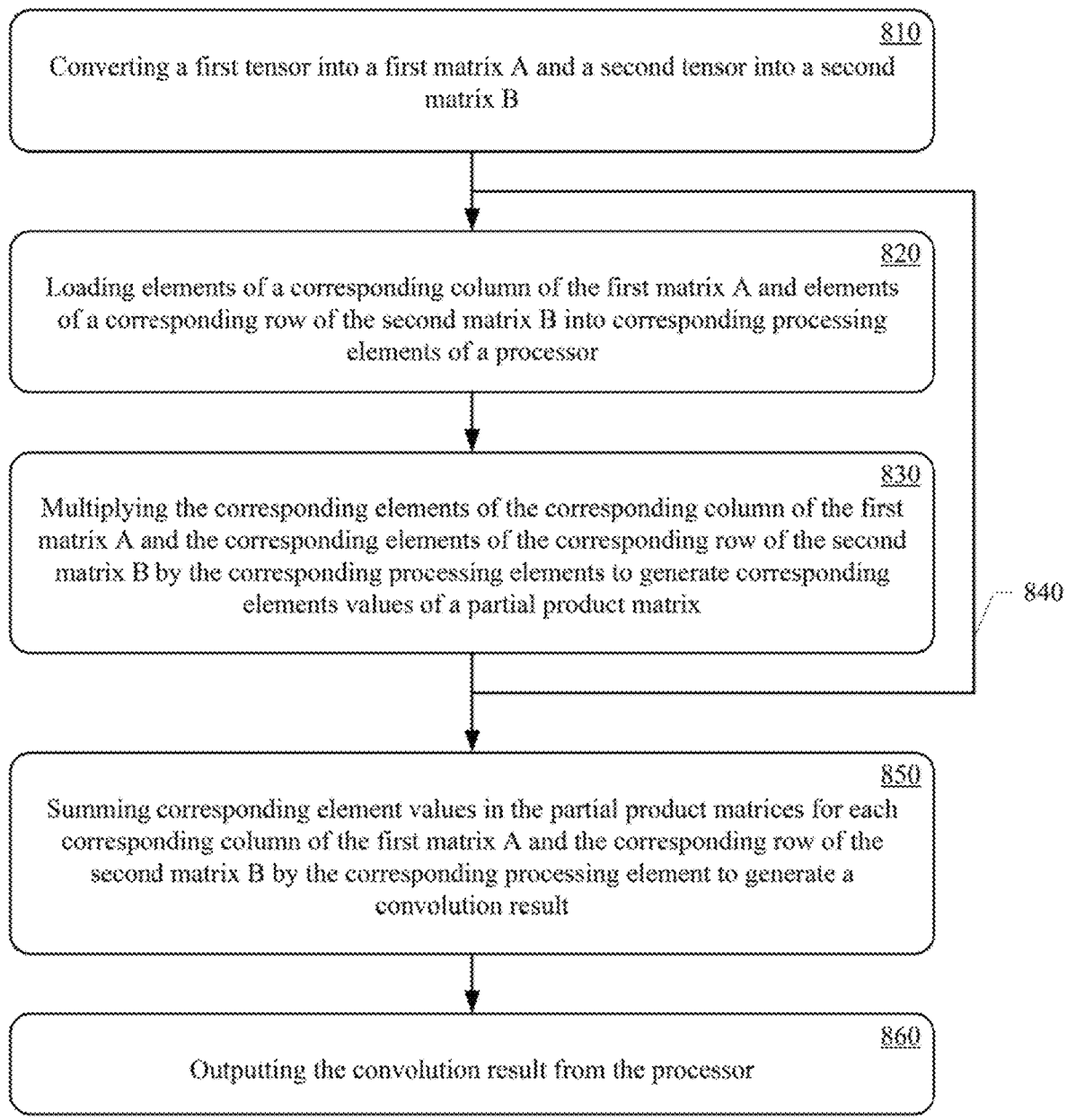
FIG. 8 shows a method of converting a convolution for computation as a summation of vector-vector outer-products on a computing device, in accordance with aspects of the present technology.

Similarly, a convolution can be computed by converting a first tensor and a second tensor into first and second matrices respectively, and computing a summation of vector-vector outer-products of the first and second matrices. As illustrated in FIG. 7, a first tensor can include a plurality of input channel matrices ($Ch_I$) of $D_F \times D_F$, and a second tensor can include a plurality of kernels wherein each kernel includes a plurality of input channel matrices ($Ch_I$) of $D_K \times D_K$. The second tensor is convolved over the first tensor to produce an output vector including a plurality of output channel matrices $Ch_O$ of $D_F \times D_F$ (assuming appropriate padding and stride of 1 for illustrative purpose). The computation of the convolution will be further explained with reference to FIG. 8, which shows an iterative process of converting a convolution for computation as a summation of vector-vector outer-products. The computation of the convolution will also be further explained with reference to the matrix multiplication engine of FIGS. 3 and 6.

To compute the convolution, the first tensor 710 can be converted to a first matrix A 720 and the second tensor 730 can be converted to a second matrix B 740, at 810. In one implementation, the first tensor 710 including a plurality of input channel matrices ($Ch_I$) of $D_F \times D_F$, can be converted to a first matrix A 720 of $D_K \times D_K \times Ch_I$ columns and $D_F \times D_F$ rows. The second tensor 730 including a plurality of kernels or the like, each including a plurality of input channel matrices ($Ch_I$) of $D_K \times D_K$, can be converted to a second matrix B 740 of $Ch_O$ columns and $D_K \times D_K \times Ch_I$ rows. In one implementation, the first and second tensors can be converted to first and second matrices and then stored into one or more memories. In another implementation, the first and second tensors can be converted to first and second matrix as part of loading into corresponding processing elements 311 of the processor 300.

At 820, elements values of corresponding columns of the first matrix A 720 and element values of the corresponding row of the second matrix B 740 are loaded into corresponding processing elements of the processor. For example, in a first iteration the first element value in the first column of the first matrix A 720 and the first element value in the first row of the second matrix B 740 can be loaded into a first processing element, and so on with an $(D_F \times D_F)$th element values in the first column of the first matrix A 720 and the $(Ch_O)$th element value in the first row of the second matrix B 740 loaded into a corresponding processing element. In an $(D_K \times D_K \times Ch_I)$ th iteration, the first element value the $(D_K \times D_K \times Ch_I)$th column of the first matrix A 720 and the first element value in the $(D_K \times D_K \times Ch_I)$th row of the second matrix B 740 can be loaded into the first processing element, and so on with an $(D_F \times D_F)$th element values in the $(D_K \times D_K \times Ch_I)$th column of the first matrix A 720 and the $(Ch_O)$th element value in the first row of the second matrix B 740 loaded into a corresponding processing elements.

At 830, the corresponding elements of the corresponding column of the first matrix A 720 and the corresponding elements of the corresponding row of the second matrix B 740 can be multiplied by the corresponding processing elements to generate corresponding element values of a partial product matrix C 750. At 840, the processes at 820 and 830 can be iteratively performed for each set of corresponding columns of the first matrix A 720 and the corresponding rows of the second matrix B 740. For example, in a first iteration the element values in the first column of the first matrix A 720 and the elements values in the corresponding rows of the second matrix B 740 can be loaded into the corresponding processing elements. The first set of corresponding element values can then be multiplied by the corresponding processing elements. In a second iteration, the element values of the second column of the first matrix A 720 and corresponding element values of the second row of the second matrix B 740 can be loaded into the corresponding processing elements. The second set of corresponding element values can then be multiplied by the corresponding processing elements. The element values of the Nth column of the first matrix A 720 and the corresponding element values of the Nth row of the second matrix B 740 can be loaded into the corresponding processing elements and multiplied together in a last iteration.

At 850, corresponding element values in the partial products, for each corresponding column of the first matrix A 720 and the corresponding row of the second matrix B 740, can be summed by the corresponding processing elements to generate a convolution result. In one implementation, the corresponding element values can be accumulated as they are computed at 830 to sum the partial products. In one implementation, the accumulated values can be converted from a matrix C 750 back to a tensor 760 after the iterative accumulation of the corresponding element values have been completed. In another implementation, the resulting matrix C 750 can be convened back to a tensor 760 as part of storing the result after iterative accumulation of the corresponding element values have been completed. At 860, the convolution result can be output from the processor 310. Outputting the convolution can include storing the convolution result in one or more memories, by outputting the convolution result on a monitor, inputting it to another computing process performed on the computing device 300 or any other computing device, or the like.

Figure 9:
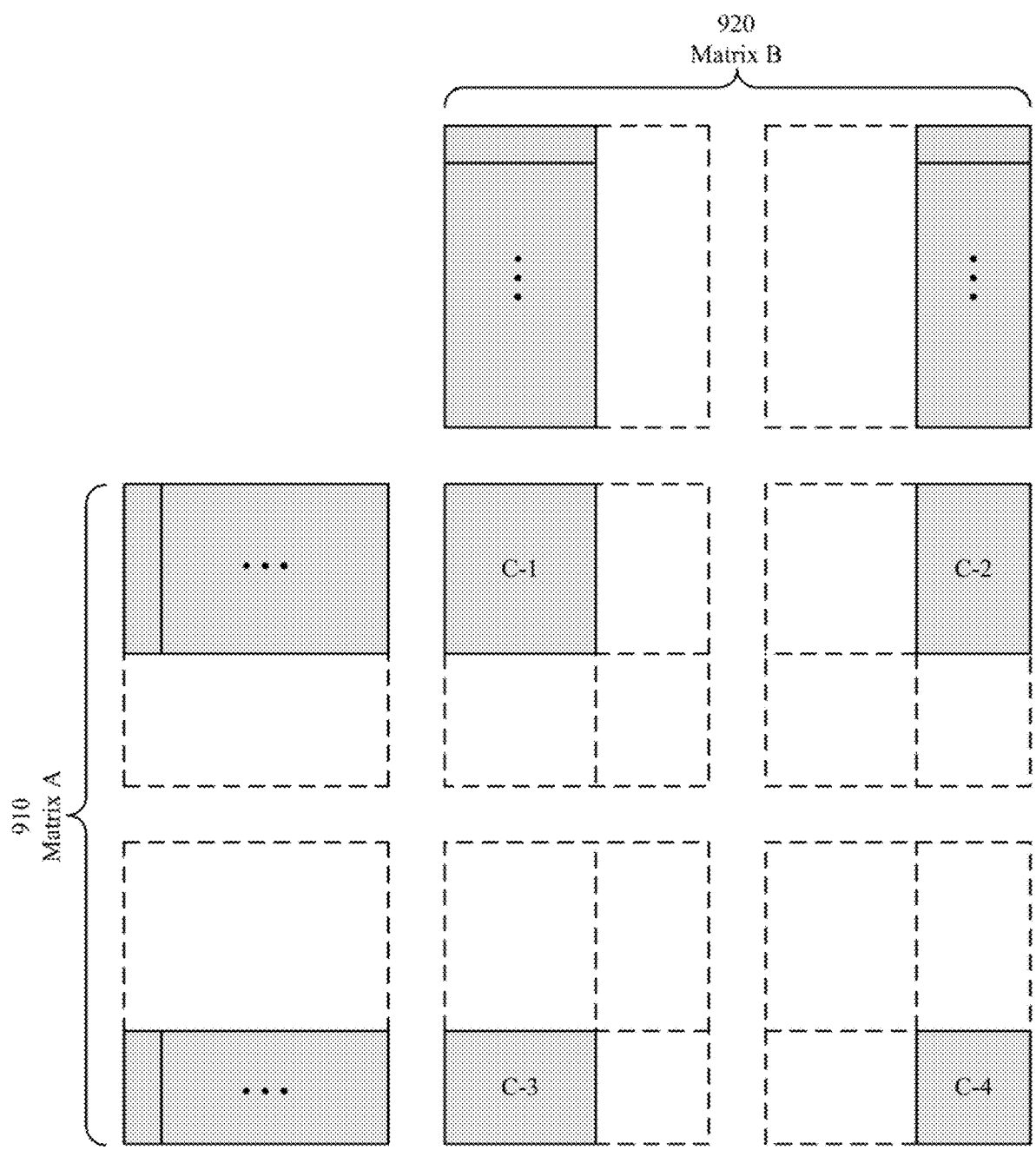
FIG. 9 illustrates partitioning of matrices for matrix-matrix multiplication by summation of vector-vector outer-products, in accordance with aspects of the present technology.
Figure 10:
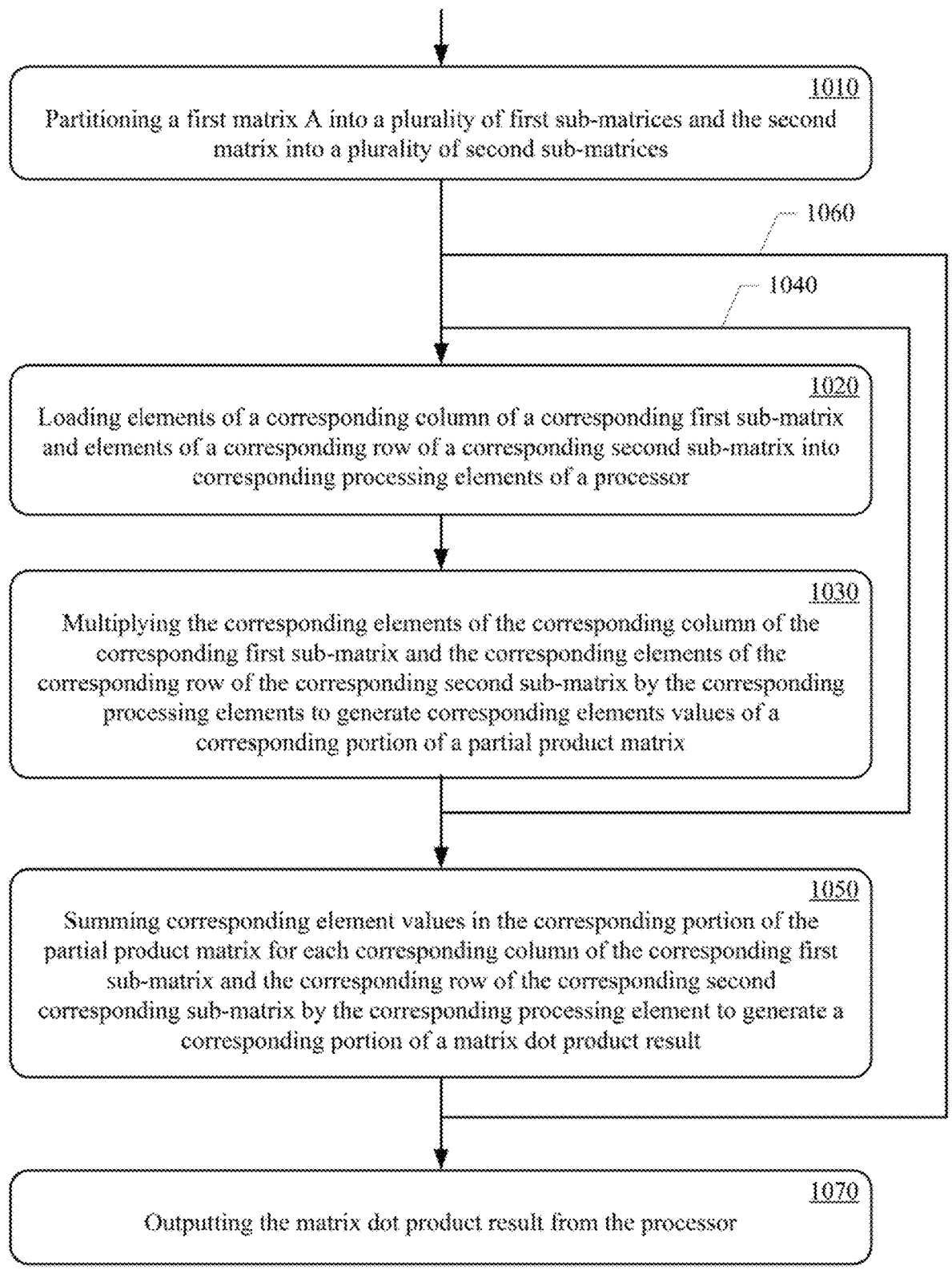
FIG. 10 shows a method of partitioning and computing a matrix dot product as a summation of vector-vector outer-products on a computing device, in accordance with aspects of the present technology.

In cases when the size of the matrices is larger than the array of processing elements of a processor, the matrices can be partitioned into sub-matrices to perform summations of vector-vector outer-products. Referring now to FIGS. 9 and 10, a method of computing a matrix-matrix dot product, in accordance with aspects or the present technology, is shown. Computation of a matrix-matrix dot product for large matrices can include partitioning a first matrix A 910 into a plurality of first sub-matrices and partitioning a second matrix B 920 into a plurality of second sub-matrices, at 1010. In one implementation, the first matrix A 910 can be row-wise partitioned into a plurality of first sub-matrices, and the second matrix B 920 can be column-wise partitioned into a plurality of second sub-matrices.

At 1020, element values of corresponding columns of a corresponding first sub-matrix and element values of the corresponding row of a corresponding second sub-matrix are loaded into corresponding processing elements of the processor. For example, in a first iteration the first element value in the first column of a first one of first sub-matrices and the first element value in the first row of a first one of the second sub-matrices can be loaded into a first processing element, and so on. In a Jth iteration, the first element value in the Jth column of the first sub-matrix and the first element value in the Jth row of the second sub-matrix can be loaded into the first processing element, and so on.

At 1030, the corresponding elements of the corresponding column of the first matrix A 910 and the corresponding elements of the corresponding row of the second matrix B 920 can be multiplied by the corresponding processing elements to generate corresponding element values of a partial product matrix C. At 1040, the processes at 1020 and 1030 can be iteratively performed for each set of corresponding columns of the first matrix A and the corresponding rows of the second matrix B for the corresponding sub-matrices. For example, in a first iteration the element values in the first column of the first sub-matrix and the elements values in the corresponding rows of the second sub-matrix can be loaded into the corresponding processing elements. The first set of corresponding element values can then be multiplied by the corresponding processing elements. In a second iteration, the element values of the second column of the first sub-matrix and corresponding element values of the second row of the second sub-matrix can be loaded into the corresponding processing elements. The second set of corresponding element values can then be multiplied by the corresponding processing elements. The element values of the Jth column of the first sub-matrix and the corresponding element values of the Jth row of the second sub-matrix can be loaded into the corresponding processing elements and multiplied together in a last iteration.

At 1010, the processes at 1020 through 1050 can be iteratively performed for each of the plurality of sub-matrices. At 1060, the convolution result can be output from the processor 310. Outputting the convolution can include storing the convolution result in one or more memories, by outputting the convolution result on a monitor, inputting it to another computing process performed on the computing device 300 or any other co/wilting device, or the like.

Aspects of the present technology advantageously reduce data transmission between memory and the processor and between processing element of the processor. Aspects advantageously reduce data transmission by increasing data reuse by keep the partial product output stationary in the processing element. Accordingly, full output reuse of all three matrices can be achieved. Aspects of the present technology are scalable, with latency growing linearly with output matrix size. Aspects of the present technology advantageously minimize data movement with no inter-processing element data movement.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing device comprising:
   one or more memories configured to store a first matrix and a second matrix; and
   an array of processing elements, wherein each processing element includes:
      a first register to receiving corresponding columns of the first matrix from the one or more memories;
      a second register to receive corresponding rows of the second matrix from the one or more memories;
      a multiplication unit to compute a partial product for a vector-vector outer-products of corresponding element values of the first matrix for each corresponding column of the first matrix in the first register and the corresponding element values of the second matrix for each corresponding row of the second matrix in the second register; and
      a summation unit to accumulate the partial products for the vector-vector outer-products of the corresponding element values of the first matrix for each corresponding column of the first matrix and the corresponding element values of the second matrix for each corresponding row of the second matrix;
   wherein the array of processing elements are configured to generate a third matrix of the accumulated partial products of the corresponding element values of the corresponding columns of the first matrix and corresponding rows of the second matrix from the summation unit as the partial product of the vector-vector-outer-products of $$C = \sum_{k=1}^{N} A_k \otimes B_k, A_k.$$

2. The computing device of claim 1, wherein the third matrix is output from the array of processing elements for storage by the one or more memories.

3. The computing device of claim 1, wherein:
   the first matrix comprises a converted first tensor; and
   the second matrix comprises a converted second tensor.

4. The computing device of claim 3, wherein:
   the first tensor comprises an image or a feature map; and
   the second tensor comprises a set of kernels.

5. The computing device of claim 1, wherein the array of processing elements are further configured to receive corresponding columns of corresponding sub-matrices of the first matrix and corresponding rows of corresponding sub-matrices of the second matrix, compute partial products of corresponding element values of the corresponding columns of the corresponding sub-matrices of the first matrix and the corresponding rows of corresponding sub-matrices of the second matrix, and accumulate the partial products of the corresponding element values of the corresponding columns of the corresponding sub-matrices of the first matrix and the corresponding rows of corresponding sub-matrices of the second matrix to generate the third matrix.

6. A processor comprising:
   a plurality of processing elements configured to receive corresponding columns of a first matrix into first registers of corresponding processing elements and corresponding rows of a second matrix into second registers of corresponding processing elements and compute a matrix dot product of the first and second matrices as a summation of a sequence of parallel computed vector-vector outer-products according to $$C = \sum_{k=1}^{N} A_k \otimes B_k, A_k.$$

7. The processor of claim 6, wherein each of the plurality of processing elements further includes: a multiplication unit configured to compute a partial product of the element values in the first and second registers;
   a third register configured to receive a current partial product computed by the multiplication unit;
   a fourth register configured to receive an accumulated partial product; and
   a summation unit configured to add the current partial product in the third register to the accumulated partial product in the fourth register and store the result back to the fourth register.

8. The processor of claim 6, wherein the plurality of processing elements are further configured to receive corresponding one of a plurality of first sub-matrices of the first matrix and corresponding ones of a plurality of second sub-matrices of the second matrix and compute the matrix dot product as the summation of the sequence of vector-vector outer-products of corresponding sets of the plurality of the first sub-matrices and the plurality of second sub-matrices.

9. The processor of claim 8, wherein:
   the plurality of first sub-matrices comprise a plurality of row-wise partitions of the first matrix; and
   the plurality of second sub-matrices comprise a plurality of column-wise partitions of the second matrix.

10. The processor of claim 6, wherein:
    the first matrix comprises a converted first tensor; and
    the second matrix comprises a converted second tensor.

11. A computing device implemented method of computing a matrix-matrix dot product comprising:
    iteratively loading element values of corresponding columns of a first matrix from memory into a first register of corresponding processing elements of an array of processing elements and corresponding rows of a second matrix from memory into a second register of the corresponding processing elements of the array of processing elements;
    computing partial products of a vector-vector outer-products of element values by the corresponding processing elements in parallel for each iteration of the corresponding columns of the first matrix and the corresponding rows of the second matrix; and
    computing a sum of the partial products by the corresponding processing elements for the corresponding columns of the first matrix and the corresponding rows of the second matrix of the vector-vector outer-products of $$C = \sum_{k=1}^{N} A_k \otimes B_k, A_k.$$

12. The computing device implemented method of computing a matrix-matrix dot product of claim 11, wherein computing the partial products of element values comprises multiplying element values in the first register and the second register by the corresponding processing elements.

13. The computing device implemented method of computing a matrix-matrix dot product of claim 12, wherein computing the sum of the partial products comprises accumulating the partial products by the corresponding processing elements.

14. The computing device implemented method of computing a matrix-matrix dot product of claim 11, further comprising outputting the sum of partial products from the array of processing elements as a third matrix.

15. The computing device implemented method of computing a matrix-matrix dot product of claim 11, further comprising:
  converting a first tensor into the first matrix; and
  converting a second tensor into the second matrix.

16. The computing device implemented method of computing a matrix-matrix dot product of claim 15, further comprising:
  converting the sum of partial products from the array of processing elements into a third tensor.

17. The computing device implemented method of computing a matrix-matrix dot product of claim 11, further comprising:
  row-wise partitioning the first matrix into a plurality of first sub-matrices;
  column-wise partitioning the second matrix into a plurality of second sub-matrices;
  iteratively loading element values of corresponding columns of corresponding first sub-matrices and corresponding rows of corresponding second sub-matrix from memory into corresponding processing elements of an array of processing elements;
  computing partial products of element values by the corresponding processing elements for each iteration of the corresponding columns of the corresponding first sub-matrices and the corresponding rows of the corresponding second sub-matrices; and
  computing a sum of the partial products by the corresponding processing elements for the corresponding columns of the corresponding first sub-matrices and the corresponding rows of the corresponding second sub-matrices.

* * * * *